(12) United States Patent
Fukaya et al.

(10) Patent No.: US 8,034,417 B2
(45) Date of Patent: Oct. 11, 2011

(54) PROCESS FILM FOR USE IN PRODUCING CERAMIC GREEN SHEET AND METHOD FOR PRODUCTION THEREOF

(75) Inventors: Tomomi Fukaya, Saitama (JP); Toru Nakamura, Saitama (JP)

(73) Assignee: Lintec Corporation, Tokyo (JP)

( * ) Notice: Subject to any disclaimer, the term of this patent is extended or adjusted under 35 U.S.C. 154(b) by 0 days.

(21) Appl. No.: 12/710,493

(22) Filed: Feb. 23, 2010

(65) Prior Publication Data

US 2010/0151141 A1 Jun. 17, 2010

Related U.S. Application Data

(62) Division of application No. 10/570,667, filed as application No. PCT/JP2004/013645 on Sep. 17, 2004, now abandoned.

(30) Foreign Application Priority Data

Sep. 26, 2003 (JP) ................. 2003-334934

(51) Int. Cl.
*C08F 2/48* (2006.01)
*C08J 7/04* (2006.01)
*B32B 9/04* (2006.01)

(52) U.S. Cl. ........ 427/508; 427/515; 427/516; 428/447; 428/448

(58) Field of Classification Search .......... 428/41.4, 428/41.8, 447, 448, 372.2, 480, 387, 334, 428/451, 483; 522/99; 524/358, 359; 528/15, 528/31, 32; 427/508, 515, 516, 519, 387; 264/213, 650

See application file for complete search history.

(56) References Cited

U.S. PATENT DOCUMENTS

| | | | |
|---|---|---|---|
| 6,228,796 B1 * | 5/2001 | Arakawa et al. | 502/159 |
| 6,689,442 B2 | 2/2004 | Nakamura et al. | |
| 6,749,898 B2 | 6/2004 | Nakamura et al. | |
| 6,890,603 B2 | 5/2005 | Nakamura et al. | |
| 2002/0187357 A1 | 12/2002 | Nakamura et al. | |
| 2003/0027003 A1 | 2/2003 | Nakamura et al. | |
| 2003/0059629 A1 | 3/2003 | Nakamura et al. | |
| 2004/0241456 A1 * | 12/2004 | Yamaki et al. | 428/429 |

FOREIGN PATENT DOCUMENTS

| | | | |
|---|---|---|---|
| JP | 5-024156 | | 2/1993 |
| JP | 05024156 A | * | 2/1993 |
| JP | 5-229084 | | 9/1993 |
| JP | 08283661 | | 10/1996 |
| JP | 9-226042 | | 9/1997 |
| JP | 10-6443 | | 1/1998 |
| JP | 10006443 A | * | 1/1998 |
| JP | 11-209651 | | 8/1999 |
| JP | 2000204287 | | 7/2000 |
| JP | 2001011373 | | 1/2001 |
| JP | 2001-198910 | | 7/2001 |
| JP | 2001-205746 | | 7/2001 |
| JP | 2002-192661 | | 7/2002 |
| JP | 2003-127286 | | 5/2003 |
| KR | 2002-0003554 | | 1/2002 |

* cited by examiner

*Primary Examiner* — Stanley Silverman
*Assistant Examiner* — Anthony J Zimmer
(74) *Attorney, Agent, or Firm* — Oblon, Spivak, McClelland, Maier & Neustadt, L.L.P.

(57) ABSTRACT

There can be provided a casting film for producing a ceramic green sheet which film comprises a substrate film, an undercoat layer and a cured layer, wherein the undercoat layer is composed of a condensation polymer from a metal alkoxide and/or a partially hydrolyzed product of a metal alkoxide, and the cured layer is formed by heat treating at 40 to 120° C., an addition reaction type silicone resin composition containing a photosensitizer in a coating amount of 0.01 to 0.3 g/m² expressed in terms of solid content, and thereafter ultraviolet irradiating the composition to cure the same. The casting film, which is employed for the production of a ceramic green sheet to be used in a ceramic capacitor, a laminated inductor element and the like, can easily be produced, has favorable adhesiveness to a substrate film, is excellent in ceramic slurry coating property and releasability from a ceramic green sheet, and possesses high flatness that has never been realized by any of the prior arts together with high antistatic property.

5 Claims, No Drawings

PROCESS FILM FOR USE IN PRODUCING CERAMIC GREEN SHEET AND METHOD FOR PRODUCTION THEREOF

TECHNICAL FIELD

The present invention relates to a casting film for producing a ceramic green sheet which film is used in the case of producing a ceramic green sheet to be used for a ceramic capacitor, a laminated inductor element and the like and relates to a process for the production of the casting film. More particularly, the present invention pertains to a casting film for producing a ceramic green sheet which film is imparted with favorable adhesiveness between a silicone resin releasing agent and a substrate film for a long period of time, is excellent in antistatic property, ceramic slurry coating property and releasing property from a ceramic green sheet and at the same time, possesses high flatness that has never hitherto been realized.

BACKGROUND ART

In general, accompanying the market demand for miniaturization and weight-saving for electronic devices in recent years, the part items which constitute the devices are required to be thin-walled and lightweight.

For instance, electronic devices such as a capacitor, a laminated inductor element and the like that have heretofore been part items fitted with leads are made possible to be downsized through the practical application of a technique in which a monolithic structure equipped with an internal conductor is formed by simultaneously firing a ceramics layer having a prescribed pattern along with a laminate composed of an electroconductive layer. However, further miniaturization thereof is required at the present time.

A ceramic capacitor is usually produced by using a process comprising the steps of firstly preparing slurry by mixing ceramic powders having a high dielectric constant of a compound having perovskite-type crystalline structure such as barium titanate, a binder, an organic solvent and the like; applying coating of the slurry to a casting film made of polyethylene terephthalate or the like and drying the same to prepare a ceramic green sheet; then forming an electrode pattern on the resultant green sheet by means of screen printing or the like by using a conductive paste; peeling the ceramic green sheet off the casting film; subsequently laminating a large number of the printed ceramic green sheets in a prescribed order; bonding the same under heating and pressurizing; cutting the same into the form of desirable chips; subjecting the chips to firing treatment; and sintering the same.

On the other hand, the laminated inductor element is usually produced by using a process comprising the steps of firstly preparing a ceramic green sheet on a casting film by using magnetic ceramic powders such as ferrite in the same manner as the foregoing; then forming a coil pattern on the resultant green sheet by means of screen printing or the like by using a conductive paste; subsequently peeling the ceramic green sheet off the casting film; and then following the above-mentioned procedure to prepare the laminated inductor element in the form of chip.

The ceramic capacitor and the laminated inductor element each in the form of chip are required to be more and more miniature in order to cope with the demand for miniaturization as mentioned hereinbefore. Accompanying such demand, the ceramic green sheet, which has a thickness of 5 to 20 μm at the present time, is required to be thinner.

Since the previous casting film cannot cope with the green sheet which is made to have such a small thickness, a film having further high performances are necessitated, namely a casting film which is excellent in ceramic coating property and releasability from a ceramic green sheet and which has an extremely high flatness free from wrinkles and the like due to thermal shrinkage.

There has hitherto been generally used as a casting film, a polyethylene terephthalate film (PET film) which has been subjected to releasing treatment with a silicone resin based releasing agent of heat-curable addition reaction type. However, the silicone resin based releasing agent of heat-curable addition reaction type must be crosslinked usually at a high temperature of 140° C. or higher in order to assure a stable cured film. Consequently, wrinkles due to thermal shrinkage inevitably take place on a PET film in the releasing treatment step. Wrinkles due to thermal shrinkage, when being present on a PET film, bring about the problem in that the ceramic slurry cannot be made into a uniform thin-film sheet at the time of film forming.

Under such circumstances, in order to suppress the occurrence of the wrinkles due to thermal shrinkage to the utmost, an attempt is made to carry out the processing treatment with the silicone resin based releasing agent of heat-curable addition reaction type by lowering the processing rate under a condition of a lower temperature (110 to 130° C.). Nevertheless, the above-mentioned attempt gives rise to problems of not only inferior productivity but also insufficient curing, poor adhesion stability of the silicone resin for the PET film and poor coating property of the ceramic slurry.

In addition, a silicone resin based releasing agent of ultraviolet-alone-curable type which has a functional group such as an epoxy group, an acrylate group, a mercapto group or the like is known as a low temperature-curable silicone resin based releasing agent. However, the silicone resin based releasing agent just mentioned is difficult to assure uniform coated surface of the silicone resin and besides, is unstable and inferior in releasability of the ceramic green sheet.

In order to solve the above-mentioned problems, the present inventors had developed a casting film for producing a ceramic green sheet which casting film is obtained by applying coating of an addition reaction type silicone resin composition as a releasing agent containing a photosensitizer to a substrate film in a specific thickness, heat treating the coating at a prescribed temperature, and thereafter irradiating the same with ultraviolet rays {for instance, refer to Japanese Patent Application Laid-Open No. 198910/2001}.

Nevertheless, it has been proved that the film coated with a silicone resin has a high electrification property, thus causing various problems. For instance, surface electrification sometimes allows foreign matters to adhere thereto, thereby bringing about a defect or fault on the ceramic slurry to be applied onto the film. Moreover, film surface electrification sometimes causes fluctuation and repelling of the ceramic slurry to be applied thereto, thus failing to obtain a uniform thin film sheet. Further, such a problem is sometimes caused in that the slurry is disintegrated by defective peeling due to peeling electrification of a casting film for producing a ceramic green sheet in a step of peeling the ceramic slurry off the film.

Accordingly, importance has been attached in recent years to antistatic property of a casting film for producing a ceramic green sheet in addition to the above-mentioned adhesiveness to the substrate film, coating property of the ceramic slurry, releasability of the ceramic green sheet and a high flatness.

DISCLOSURE OF THE INVENTION

Under such circumstances, it is an object of the present invention to provide a casting film for producing a ceramic green sheet which casting film is employed in the case of producing a ceramic green sheet to be used for a ceramic capacitor, a laminated inductor element and the like, is capable of forming a cured silicone resin composition layer having favorable adhesiveness to a substrate film, is excellent in coating property of the ceramic slurry, releasability of ceramic green sheet and at the same time, has not only a high flatness but also a high antistatic property.

In order to achieve the above-mentioned object, various research and investigation were accumulated by the present inventors. As a result, it has been found that a casting film for producing a ceramic green sheet is obtainable which casting film is capable of solving the aforesaid problems by a method comprising the steps of forming, on a substrate film, an undercoat layer composed of a condensation polymer from a metal alkoxide and/or a partially hydrolyzed product of a metal alkoxide, applying a coating of addition reaction type silicone resin composition containing a photosensitizer in a casting film for producing a ceramic green sheet in a specific quantity to constitute a cured layer, heat treating the layer, and ultraviolet irradiating the same. Thus, the present invention has been accomplished based on the findings. That is to say, the present invention provides the following:

1. A casting film for producing a ceramic green sheet which film comprises a substrate film, an undercoat layer and a cured layer, wherein said undercoat layer is composed of a condensation polymer from a metal alkoxide and/or a partially hydrolyzed product of a metal alkoxide, and said cured layer is formed by heat treating at 40 to 120° C. an addition reaction type silicone resin composition containing a photosensitizer in a coating amount of 0.01 to 0.3 $g/m^2$ expressed in terms of solid content, and thereafter ultraviolet irradiating the same to cure the composition.
2. The casting film for producing a ceramic green sheet as set forth in the preceding item 1, wherein said metal alkoxide is tetraalkoxysilane.
3. The casting film for producing a ceramic green sheet as set forth in the preceding item 1 or 2, wherein said addition reaction type silicone resin composition contains polydimethylsiloxane having at least one functional group.
4. The casting film for producing a ceramic green sheet as set forth in the preceding item 3, wherein said functional group is hexenyl group and/or vinyl group.
5. The casting film for producing a ceramic green sheet as set forth in any of the preceding items 1 to 4, wherein the substrate film is made of polyethylene terephthalate.
6. A process for the production of a casting film for producing a ceramic green sheet which process comprises the steps of forming, on a substrate film, an undercoat layer composed of a condensation polymer from a metal alkoxide and/or a partially hydrolyzed product of a metal alkoxide by applying a coating thereof; placing an addition reaction type silicone resin composition containing a photosensitizer in a coating amount of 0.01 to 0.3 $g/m^2$ expressed in terms of solid content; heat treating the composition at 40 to 120° C.; and subsequently ultraviolet irradiating the same to cure the composition.

THE MOST PREFERRED EMBODIMENT TO CARRY OUT THE INVENTION

The casting film for producing a ceramic green sheet according to the present invention (hereinafter sometimes simply referred to as casting film according to the present invention) comprises a substrate film, an undercoat layer which is placed thereon and is composed of a condensation polymer from a metal alkoxide and/or a partially hydrolyzed product of a metal alkoxide, and a cured layer wherein an addition reaction type silicone resin composition containing a photosensitizer has been cured.

The substrate film, which is not specifically limited, may be properly selected for use from the publicly known optional products that have been usable for a casting film for producing a ceramic green sheet. The substrate film may be exemplified by a polyester film such as a film made of polyethylene terephthalate or polyethylene naphthalate; a polyolefin film such as a film made of polypropylene or polymethylpentene; a polycarbonate film; and polyvinyl acetate film. Of these, a polyester film is preferable, and biaxially oriented polyethylene terephthalate film is particularly preferable. A substrate film having a thickness of 12 to 125 μm is usually used.

The undercoat layer to be formed on the above-mentioned substrate film in the casting film according to the present invention is composed of a condensation polymer from a metal alkoxide and/or a partially hydrolyzed product of a metal alkoxide. The undercoat layer, which is formed thereon, imparts antistatic property to the casting film, and is characterized by its favorable adhesiveness to both the substrate film and the cured layer. The metal alkoxide, which is generally represented by the general formula $M(OR)n$. The metal M, which is not specifically limited, is exemplified by an alkali metal such as lithium, sodium and potassium; an alkaline earth metal such as magnesium, calcium, strontium and barium; group 3 elements in the Periodic Table such as scandium and yttrium; group 4 elements in the Periodic Table such as titanium, zirconium and hafnium; group 5 elements in the Periodic Table such as vanadium, niobium and tantalum; group 6 elements in the Periodic Table such as molybdenum and tungsten; group 8 elements in the Periodic Table such as iron; group 12 elements in the Periodic Table such as zinc; group 13 elements in the Periodic Table such as boron, aluminum, gallium and indium; group 14 elements in the Periodic Table such as silicon, germanium, tin and lead; a group 15 elements in the Periodic Table such as phosphorus, antimony and bismuth; and lanthanoids such as lanthanum. Of these, silicon is most preferable for its excellent antistatic property and its high adhesiveness to the cured layer as described hereinafter. Specifically, tetraalkoxysilane is most preferable. The above-cited metal alkoxide may be used alone or by being mixed with a plurality of metal alkoxide species.

In the general formula, R represents an alkyl group, which has preferably 1 to 10 carbon atoms, more preferably 1 to 5 carbon atoms in the present invention. A plurality of alkyl groups, when being present in one kind of metal alkoxide, may be the same as or different from one another. The symbol n is an integer to be determined by the valency of the metal M and is usually in the range of 1 to 5.

The metal alkoxide may be partially hydrolyzed in advance. Likewise a mixture of a metal alkoxide and a partially hydrolyzed metal alkoxide may be used.

Usable method for forming the undercoat layer is not specifically limited, but may be any of various methods, and the layer is preferably formed by applying a coating of liquid containing a metal alkoxide and/or a partially hydrolyzed product of a metal alkoxide to the substrate film.

The coating amount of the undercoat layer expressed in terms of solid content is not specifically limited, but is in the range of preferably 0.01 to 0.3 $g/m^2$. The coating amount, when being 0.01 $g/m^2$ or more, brings about such advantages as assuring uniform coated film, assuring favorable adhesiveness between the substrate film and the undercoat layer and between the undercoat layer and the cured layer and at the same time, assuring sufficient antistatic property. On the other hand, the coating amount, when being 0.3 $g/m^2$ or less, brings about such advantage as assuring coated surface in a uniform state. From the above-mentioned point of view, the coating amount of the undercoat layer expressed in terms of solid content is in the range of more preferably 0.05 to 0.2 g/m$^2$.

As a method for applying the coating solution, usually customarily used methods may be properly optionally usable, and are exemplified by gravure coating method, bar coating method, spray coating method and spin coating method. It is possible at the time of coating to dissolve the metal alkoxide and/or a partially hydrolyzed product of a metal alkoxide in a solvent and to preferably use an organic solvent. Usable organic solvents are not specifically limited, but are exemplified by alcohol based solvents such as ethanol and isopropanol; and ketone based solvents such as methyl ethyl ketone.

The aforesaid metal alkoxide and/or a partially hydrolyzed product of a metal alkoxide form a condensation polymer by hydrolytic reaction and polycondensation reaction, thereby constituting the undercoat layer. In order to promote the hydrolytic reaction, an acid catalyst such as hydrochloric acid and nitric acid may be added thereto.

For the purpose of accelerating the polycondensation reaction of the metal alkoxide and/or a partially hydrolyzed product of a metal alkoxide and drying the same after they have been applied in the aforesaid method, it is preferable to heat treat the same. The heating conditions are not specifically limited within the extent that the object as mentioned above is achievable, but are preferably in the range of usually 40 to 120° C. as heating temperature and 20 seconds to 2 minutes as heating time. With a view to enhance the productivity and prevent wrinkle due to thermal shrinkage, it is further preferable that the heating temperature be in the range of 80 to 110° C., and the heating time be in the range of 30 seconds to 1 minute. Taking into consideration the strength of the under coat layer, the degree of polymerization of the condensation polymer is in the range of preferably 5 to 7000, approximately.

The cured layer of the silicone resin composition formed on the undercoat layer that is placed on the above-mentioned substrate film in the casting film according to the present invention is formed by subjecting the addition reaction type silicone resin composition containing a photosensitizer to both heating treatment and ultraviolet irradiation to cure the composition.

The previous silicone resin based releasing agent of heat curable addition reaction type, which needs a high temperature treatment in order to obtain a stable cured film, cannot afford satisfactory performances when treated at a low temperature owing to insufficient curing. As a countermeasure thereagainst, mention may be made of increasing the amount of a catalyst to be added and lowering the processing rate. However, increasing the amount of a catalyst affects the pot life, and lowering the processing rate leads to decrease in the productivity.

As opposed to the foregoing, the present invention enables, by adding a photosensitizer and curing by heating and ultraviolet ray irradiation together, to obtain a casting film which forms cured silicone resin composition layer having favorable adhesiveness to both the substrate film and the undercoat layer, which has an extremely high flatness free from wrinkle due to thermal shrinkage and at the same time, which is imparted with excellent ceramic slurry coating property, favorable releasability for ceramic green sheet and further antistatic property.

The addition reaction type silicone resin composition containing a photosensitizer to be used in the present invention comprises principal ingredients which are composed of a addition reaction type silicone resin (for instance, polydimethylsiloxane having a functional group) and a cross-linking agent (for instance, a cross-linking agent composed of silicone resin and the like such as polymethylhydrogensiloxane), and which are incorporated with a catalyst (for instance, platinum based catalyst) and a photosensitizer, and as desired, an addition reaction inhibitor, a release modifier such as silicone gum and silicone varnish, an adhesion improver and the like.

The addition reaction type silicone resin is not specifically limited, but may be selected for use from a variety thereof, for instance, from those that have been customarily used as conventional heat curable addition reaction type silicone resin based releasing agents. Such silicone resin may be exemplified by at least one species selected from polyorganosiloxane bearing an alkenyl group as a functional group in a molecule. Preferable examples of the above-exemplified polyorganosiloxane bearing an alkenyl group as a functional group in a molecule include polydimethylsiloxane bearing a vinyl group as a functional group, polydimethylsiloxane bearing a hexenyl group as a functional group and mixtures thereof. Of these, is particularly preferable the polydimethylsiloxane bearing a hexenyl group as a functional group in view of its excellent curability and stable favorable releasability being assured for a green sheet.

The cross-linking agent is exemplified by polyorganosiloxane bearing in its one molecule, at least two hydrogen atoms each bonded to a silicon atom, specifically by dimethylsiloxane/methylhydrogen-siloxane copolymer the end of which is hindered with dimethylhydrogensiloxy group, dimethylsiloxane/methylhydrogen-siloxane copolymer the end of which is hindered with trimethylsiloxy group, poly(methylhydrogen-siloxane) the end of which is hindered with trimethylsiloxy group and poly(hydrogen-silsesquioxane). The amount of the exemplified cross-linking agent to be used is selected in the range of 0.1 to 100 parts by weight, preferably 0.3 to 50 parts by weight based on 100 parts by weight of the addition reaction type silicone resin.

Examples of the silicone resin having the function of modifying the release characteristics of the cured film include for instance, polyorganosiloxane not bearing in its one molecule, an alkenyl group or a hydrogen atom each bonded to a silicon atom, specifically by poly(dimethylsiloxane) the end of which is hindered with trimethylsiloxy group and poly (dimethlysiloxane) the end of which is hindered with dimethylphenylsiloxy group.

There is usually used as a catalyst, a platinum based compound, which is exemplified by particulate platinum, particulate platinum adsorbed on a carbon powder carrier, chloroplatinic acid, alcohol-modified chloroplatinic acid, an olefin complex of chloroplatinic acid, a palladium based catalyst and a rhodium based catalyst. The amount of the catalyst to be used is in the range of 1 to 1000 ppm by mass approximately expressed in terms of a platinum based metal on the basis of the total amount of the addition reaction type silicone resin and the cross-linking agent.

The photosensitizer to be used in the addition reaction type silicone resin composition is not specifically limited, but may be properly optionally selected for use from those that have heretofore been customarily used in ultraviolet curable resin. Examples thereof include benzoins, benzophenones, acetophenones, α-hydroxy ketones, α-amino ketones, α-diketons, α-diketone dialkyl acetals, anthraquinones, thioxanthones and the other compounds.

Examples of benzoins include benzoin, benzoin methyl ether, benzoin ethyl ether, benzoin isopropyl ether, benzoin n-butyl ether, benzoin isobutyl ether and a compound in which benzoin is ether linked to both the ends of polydimethylsiloxane. Examples of benzophenones include benzophenone, p-phenylbenzophenone, 4,4'-diethylaminobenzophenone, dichlorobenzophenone, trimethyl-silanized benzophenones and 4-methoxybenzophenone. Examples of acetophenones include acetophenone, dimethylaminoacetophenone, 3-methylacetophenone, 4-methylacetophenone, 4-allylacetophenone, 3-pentylacetophenone and propiophenone. Examples of α-hydroxy ketones include 2-hydroxy-1-(4-isopropyl)phenyl-2-methylpropane-1-one, 2-hydroxy-2-methyl-1-phenylpropane-1-one, 1-[4-(2-hydroxyethoxy)phenyl]-2-hydroxy-2-methlypropane-1-one and 1-hydroxycyclohexylphenyl ketone. Examples of α-amino ketones include 2-methyl-1-[4-(methylthio)phenyl]-2-morpholinopropane-1-one and 2-benzyl-2-dimethylamino-1-(4-morpholinophenyl)butane-1-one. Examples of α-diketons include benzyl diketone and diacetyl diketone. Examples of α-diketone dialkyl acetals include benzyldimethyl acetal and benzyldiethyl acetal. Examples of anthraquinones include 2-methyl anthraquinone, 2-ethyl anthraquinone, 2-tert-butyl anthraquinone and 2-amino anthraquinone. Examples of thioxanthones include 2-methylthioxanthone, 2-ethylthioxanthone, 2-chlorothioxanthone, 2,4-dimethylthioxanthone and 2,4-diethylthioxanthone. Examples of other compounds include tertiary amines such as triphenylamine and p-dimethylaminobenzoic acid ester and azo compounds such as azobisisobutyronitrile.

The above-exemplified photosensitizer may be used alone or in combination with at least one other species. The amount thereof to be used is selected in the range of usually 0.01 to 30 parts by weight, preferably 0.05 to 20 parts by weight on the basis of 100 parts by weight of the total sum amount of the above-mentioned addition reaction type silicone resin and the cross-linking agent.

The addition reaction inhibitor is the component which is used for the purpose of imparting shelf life stability at room temperature to the composition and is specifically exemplified by 3,5-dimethyl-1-hexyne-3-ol, 3-methyl-1-pentene-3-ol, 3-methyl-3-pentene-1-in, 3,5-dimethyl-3-hexene-1-in, cyclic tetravinylsiloxane and benzotriazole.

According to the present invention, a coating solution having viscosity enabling coating is prepared by adding in an organic solvent, the above-mentioned addition reaction type silicone resin composition containing a photosensitizer and a variety of components to be used as desired each at a prescribed ratio. In this case, any of various organic solvents may be used without specific limitation. Examples thereof include hydrocarbon compounds such as toluene, hexane and heptane in the beginning, ethyl acetate, methyl ethyl ketone and mixtures thereof.

According to the present invention, the coating solution thus prepared is applied to either or both sides of the aforesaid substrate film by means of, for instance, gravure coat method, bar coat method, spray coat method, spin coat method, so that there is formed a layer of the addition reaction type silicone resin composition containing a photosensitizer in a coating amount within the range of 0.01 to 0.3 g/m$^2$ expressed in terms of solid content. The coating amount, when being 0.01 g/m$^2$ or more, brings about favorable releasability of the ceramic green sheet, whereas the coating amount, when being 0.3 g/m$^2$ or less, gives rise to favorable coating property of ceramic slurry such as capability of suppressing the repelling at the time of applying the slurry. Taking into consideration the releasability of the ceramic green sheet and the coating property of the ceramic slurry, the coating amount is in the range of preferably 0.05 to 0.2 g/m$^2$, particularly preferably 0.07 to 0.15 g/m$^2$.

According to the present invention, the substrate film equipped thereon with the above-mentioned undercoat layer and the layer of the addition reaction type silicone resin composition is firstly heat treated at a temperature in the range of 40 to 120° C. so as to preliminarily cure the layer of the addition reaction type silicone resin. The heat treatment temperature, when being higher than 40° C., enables sufficient drying and preliminarily curing, whereas the temperature, when being lower than 120° C., results in suitable state without causing any wrinkle due to thermal shrinkage. In view of more sufficient drying and preliminarily curing and also the suppression of wrinkle due to thermal shrinkage, the heat treatment temperature is in the range of more preferably 50 to 100° C.

In the present invention, the preliminarily cured layer of the silicone resin composition is subjected to inline ultraviolet ray irradiation to completely cure the composition. In this case usable ultraviolet lamps are available from previously well known lamps such as high pressure mercury vapor lamp, metal halide lamp, high power metal halide lamp and non-electrode ultraviolet lamp. Of these, non-electrode ultraviolet lamp is preferable from the viewpoints of less thermal damage to the substrate film and favorable curability of the silicone resin due to suitable ultraviolet emission efficiency, an amount of infrared ray irradiation and the like. The foregoing lamp is available from D bulb, H bulb, H+ bulb, V bulb and the like manufactured by Fusion Corporation, of which H bulb and H+ bulb are particularly preferable. The ultraviolet irradiation output, which may be properly optionally selected, is in the range of usually 30 W/cm to 600 W/cm, preferably 50 W/cm to 360 W/cm.

The temperature at the time of ultraviolet irradiation treatment is not specifically limited, but may be any of a heated state immediately after the heat treatment and a state of room temperature, provided that inline irradiation treatment is carried out.

In the foregoing manner, there is formed the cured layer in which the addition reaction type silicone resin composition is cured on either or both sides of the substrate film equipped with the undercoat layer, while assuring satisfactory adhesion to both the substrate film and the undercoat layer, whereby the casting film according to the present invention is obtainable which is free from wrinkle or the like due to thermal shrinkage, is imparted with an extremely high flatness, is excellent in the coating property of the ceramic slurry and also releasability of the ceramic green sheet and at the same time, has high antistatic property.

The casting film according to the present invention is used for producing ceramic green sheets, and is well suited for producing ceramic green sheets having a thickness of preferably 20 μm or less, more preferably 10 μm or less, particularly preferably 6 μm or less.

Examples of the ceramic green sheet to which the casting film according to the present invention is applied include a ceramic green sheet having a high dielectric constant which is used for a ceramic capacitor in the form of a chip and a magnetic ceramic green sheet which is used for a laminated inductor element in the form of a chip. In particular, it is desirable to apply the casting film according to the present invention to the production of a green sheet used for a ceramic microcapacitor which has a chip size of 1005 type and is intended to miniature portable devices.

Examples of the ceramics having a high dielectric constant in a ceramic green sheet to be used for a ceramic capacitor include a compound having a perovskite type crystalline structure, for instance, barium titanate ($BaTiO_3$) in the beginning, $PbTiO_3$, $KNbO_3$, $Pb(Ni_{1/3}Nb_{2/3})O_3)$, $Cd_2Nb_2O_7$, $PbNb_2O_6$ and $PbTa_2O_6$.

On the other hand, examples of the magnetic ceramics in the ceramic green sheet which is used for a laminated inductor element include spinel type ferrite or hexagonal crystal type ferrite such as Zn base ferrite, Ni base ferrite, Mn base ferrite, Mg base ferrite, Ni—Zn base ferrite, Mn—Zn base ferrite, Mg—Zn base ferrite, Ni—Cu—Zn base ferrite, Mn—Mg—Zn base ferrite.

In the case of producing a ceramic green sheet, slurry is prepared for instance, by mixing ceramic powders, a proper solvent and a binder such as polyvinyl alcohol, carboxymethyl cellulose, a butyral base binder and an acrylate base binder, the resultant slurry is applied as a coating by the use of a doctor blade or the like onto the casting film according to the present invention, and the coating is treated for drying to form a ceramic green sheet having a thickness of preferably 20 µm or less, more preferably 10 µm or less, particularly preferably 6 µm or less.

In the case of a green sheet to be used for a ceramic capacitor, a desirable electrode pattern (internal electrode pattern) is formed on the green sheet thus formed through screen printing or the like by the use of ceramic powders having the above-mentioned high dielectric constant as the ceramic powders and conductive paste for printing containing a metal conductor. The resultant ceramic green sheets thus formed are released from the casting film, and usually at least 100 sheets are laminated, bonded under heating and pressure, thereafter cut into the form of desirable chip, then fired and sintered, whereby a ceramic capacitor is obtained which has monolithic constitution with a form of a chip and is equipped with the internal electrode.

In the case of a laminated inductor element, a desirable coil pattern (internal conductor pattern) is formed on the ceramic green sheet by the use of the above-mentioned magnetic ceramic powders as the ceramic powders and in the same manner as in the case of the ceramic capacitor and subsequently, the procedures same as the foregoing are carried out, whereby a laminated inductor element is obtained which has monolithic constitution with a form of a chip and is equipped with the internal electrode conductor.

EXAMPLE

In the following, the present invention will be described in more detail with reference to working examples, which however shall never limit the present invention thereto.
(1) Curability
The surfaces of the cured coat of the casting film were strongly rubbed ten times with fingers, whereupon smear and rubbing off were observed. Thus, the curability of the film was evaluated on the basis of the under-mentioned criterion.
A: no smear nor rubbing off observed at all.
B: slight smear observed (practically no problem)
C: smear and rubbing off observed to some extent (sometimes causing a practical problem)
D: much smear observed with frequent rubbing off (usually causing practical problem)
E: much rubbing off observed with insufficient curing.
(2) Flatness (Wrinkle Due to Thermal Shrinkage)
Visual observation was made of wrinkle if any on the casting film, and ceramic slurry was applied onto the cured coating so as to become 3 µm in thickness to examine whether or not uniform coating was possible. Thus, the flatness of the film was evaluated on the basis of the under-mentioned criterion.

A: no wrinkle on the surface at all enabling slurry coating in a uniform thickness
B: surface wrinkle confirmed, but enabling slurry coating in a uniform thickness
C: surface wrinkle confirmed, but enabling slurry coating, causing slightly non-uniform slurry thickness (sometimes causing a practical problem)
D: much surface wrinkle confirmed, but enabling slurry coating, causing markedly non-uniform slurry thickness (usually causing a practical problem)
E: film formation impossible due to surface wrinkle
(3) Adhesiveness of Cured Layer
The surfaces of the cured coat of the casting film after the lapse of 30 days from the treatment with silicone were strongly rubbed ten times with fingers, whereupon smear and rubbing off were observed. Thus, the adhesiveness of the film was evaluated on the basis of the criterion same as the above.
(4) Releasability of the Green Sheet
(a) Peeling Force
$BaTiO_3$ slurry was prepared by adding 80 parts by mass of mixed liquid of toluene and ethanol (ratio by mass being 1:1) to 100 parts by mass of barium titanate ($BaTiO_3$) powder, 7 parts by mass of polyvinyl butyral and 3 parts by mass of dioctyl phthalate, and mixing and dispersing the mixture with a ball mill to prepare $BaTiO_3$ slurry. The resultant slurry was uniformly applied onto a casting film by means of doctor blade method so as to become 3 µm in thickness after drying, and was treated for drying to prepare a green sheet. A tacky adhesive tape (manufactured by Nitto Denko Corporation under the trade name 31B Tape) was stuck onto the green sheet, which was allowed to stand for 24 hours under the conditions of 23° C. and 50% RH, cut into a width of 20 mm. The tape was peeled off on the side of the casting film at an angle of 180° and a velocity of 100 m/minute by the use of a tensile tester to measure the power required for peeling (releasing power).
(b) Releasability of Green Sheet
A green sheet was prepared in the same manner as in the preceding item (a), and evaluations were made of the releasability of the green sheet from the releasing film in accordance with the under-mentioned criterion.
A: excellent
B: good (practically no problem)
C: somewhat inferior (sometimes causing a practical problem)
D: inferior (causing a practical problem)
E: markedly inferior
(5) Releasability of Cured Layer
The casting films in Example 1 and Comparative Example 4 were allowed to stand for 24 hours under the conditions of 23° C. and 50% RH to carry out moisture conditioning, thereafter a tacky adhesive tape (manufactured by Nitto Denko Corporation under the trade name 31B Tape) was stuck onto the surfaces of the cured layer. The films were further allowed to stand for 24 hours under the conditions of 23° C. and 50% RH, cut into a width of 50 mm, peeled off on the side of the tape at an angle of 180° and a velocity of 0.3 m/minute by the use of a tensile tester to measure the force required for peeling (peeling force) (prior to polishing).

Subsequently the surfaces of the cured layer for the casting film were polished by the use of a Gakushin testing machine, and the peeling force was measured in the same manner as prior to polishing (after polishing), wherein the measurement was made under the conditions including a load of 1 kg and polishing times of reciprocal 50 by the use of, as the Gakushin testing machine, a durable friction testing machine (manufactured by Daiei Kagaku Seiki Seisakusho under the trade name RT-200) and using a polishing piece made of non-oriented polypropylene with 80 μm thickness.

(6) Antistatic Property

A charged film was allowed to stand for 24 hours under the conditions of 23° C. and 50% RH, and thereafter surface electric resistance thereof was measured by the use of a measuring apparatus (manufactured by Advantest Corporation under the trade name R12704 Resistivity Chamber and by Takeda Riken Kogyo Co., Ltd. under the trade name Digital Electrometer TR 8652). The antistatic property increases with a decrease in the measured value.

Example 1

A coating solution A with a solid concentration of 1.5% by mass was prepared by diluting, with isopropyl alcohol, a partially hydrolyzed product of tetraalkoxysilane (trade name of Colcoat N-103x) as a partially hydrolyzed product of an metal alkoxide. The coating solution A intended for forming an undercoat layer was uniformly applied onto a 38 μm thick biaxially oriented polyethylene terephthalate (hereinafter abbreviated to PET) film by the use of a meyer bar so that the solid coating amount is made to be 0.1 g/m². The resultant coating was heated and dried at 100° C. for 1 minute to prepare an undercoat layer with a thickness of 0.1 μm after drying.

Subsequently, to 100 parts by mass of an addition reaction type silicone resin based releasing agent (manufactured by Dow Corning Toray Silicone Co., Ltd. under the trade name LTC-760A) consisting essentially of principal ingredients composed of polydimethylsiloxane having hexenyl groups as a functional group and a cross-linking agent (polymethylhydrogen siloxane) were added 2 parts by mass of a platinum based catalyst (manufactured by Dow Corning Toray Silicone Co., Ltd. under the trade name SRX-212) based on 100 parts by mass of the aforesaid principal ingredients and 1 part by mass of acetophenone as a photosensitizer based on the same. The resultant mixture was diluted with an organic solvent composed principally of toluene to prepare a coating solution B intended for forming a cured layer having a solid concentration of 1%.

The resultant coating solution B was uniformly applied onto the above-mentioned undercoat layer by the use of a meyer bar so that the thickness of the coating after drying was made to be 0.1 μm (solid coating amount of 0.1 g/m²). Subsequently, the coated undercoat layer was heat treated for 20 seconds with a hot air circulation type dryer at 50° C. and immediately thereafter was irradiated with ultraviolet ray by the use of a conveyer type ultraviolet irradiating machine fitted with one 240 W/cm Fusion H bulb under the condition of conveyer speed being 40 m/minute to cure the silicone resin composition, thereby preparing a casting film. The various properties of the casting film are given in Table 1.

Example 2

The procedure in Example 1 was repeated to prepare a casting film except that the temperature of the hot air circulation type dryer was altered to 90° C. in the heat treatment of the coating solution B. The various properties of the casting film are given in Table 1.

Example 3

To 100 parts by mass of an addition reaction type silicone resin based releasing agent (manufactured by Dow Corning Toray Silicone Co., Ltd. under the trade name SRX-211) consisting essentially of principal ingredients composed of polydimethylsiloxane having vinyl groups as a functional group and a cross-linking agent (polymethylhydrogen siloxane) were added 2 parts by mass of a platinum based catalyst (manufactured by Dow Corning Toray Silicone Co., Ltd. under the trade name SRX-212) based on 100 parts by mass of the aforesaid principal ingredients and 1 part by mass of acetophenone as a photosensitizer based on the same. The resultant mixture was diluted with an organic solvent composed principally of toluene to prepare a coating solution C intended for forming a cured layer having a solid concentration of 1% by mass. In the same manner as in Example 1, a casting film was prepared. The various properties of the casting film are given in Table 1.

Comparative Example 1

A coating solution D having a solid concentration of 1% by mass was prepared by adding 1 part by mass of a curing agent (manufactured by Shin-Etsu Chemical Co., Ltd. under the trade name CAT-PL-50T) to 100 parts by mass of a heat curable silicone (manufactured by Shin-Etsu Chemical Co., Ltd. under the trade name KS-847H) and diluting the mixture with toluene. The resultant coating solution D was uniformly applied onto a PET film by the use of a meyer bar so that the thickness of the coating after drying was made to be 0.1 μm (solid coating amount of 0.1 g/m²). Subsequently, the coated film was dried with a hot air circulation type dryer for 1 minute at a drying temperature of 140° C. to prepare a casting film. The various properties of the casting film are given in Table 1.

Comparative Example 2

The procedure in Comparative Example 1 was repeated to prepare a casting film except that the temperature of the hot air circulation type dryer was altered to 90° C. in the heat treatment of the coating solution D. The various properties of the casting film are given in Table 1.

Comparative Example 3

In the same manner as in Example 1, the coating solution A was uniformly applied onto a 38 μm thick PET film by the use of a meyer bar so that the thickness of the coating after drying was made to be 0.1 μm. Subsequently the resultant coating was dried at 100° C. for 1 minute to form an undercoat layer. The coating solution D which had been prepared in Comparative Example 1 was applied onto the above-prepared undercoat layer by the method as described in Comparative Example 1, and was dried to prepare a casting film. The various properties of the casting film are given in Table 1.

Comparative Example 4

In the same manner as in Example 1, the coating solution A was uniformly applied onto a 38 μm thick PET film by the use of a meyer bar so that the thickness of the coating after drying was made to be 0.1 μm. Subsequently the resultant coating was dried at 100° C. for 1 minute to form an undercoat layer. Then, the procedure in Comparative Example 1 was repeated to prepare a casting film by applying the coating solution D which had been prepared in Comparative Example 1 onto the resultant undercoat layer and drying the coating except that the drying temperature was made to be 90° C. The various properties of the casting film are given in Table 1.

TABLE 1

|  |  |  | Example | | | Comparative Example | | | |
| --- | --- | --- | --- | --- | --- | --- | --- | --- | --- |
|  |  |  | 1 | 2 | 3 | 1 | 2 | 3 | 4 |
| Curability |  |  | A | A | A | A | C | A | B |
| Flatness (Wrinkle due to thermal shrinkage) |  |  | A | A | A | E | A | D | A |
| Adhesiveness |  |  | A | A | A | B | D | A | B |
| Releasability of green sheet | Peeling force (mN/20 mm) |  | 5.39 | 5.39 | 9.41 | —** | 16.66 | —** | 13.02 |
|  | Releasability |  | A | A | B | —** | E | —** | D |
| Releasability of cured layer | Peeling force (mN/50 mm) | Before polishing | 56 | — | — | — | — | — | 58 |
|  |  | After polishing | 62 | — | — | — | — | — | 420 |
| Antistatic property | surface resistance (Ω/□) |  | $10^9$ | $10^9$ | $10^9$ | $10^{15}$ | $10^{15}$ | $10^9$ | $10^9$ |

**Owing to the occurrence of wrinkle due to thermal shrinkage it was impossible to uniformly apply the ceramic slurry and to form the film.

INDUSTRIAL APPLICABILITY

The casting film according to the present invention, which is employed for the production of a ceramic green sheet to be used in a ceramic capacitor, a laminated inductor element and the like, can easily be produced, has favorable adhesiveness to a substrate film, is excellent in ceramic slurry coating property and releasability from a ceramic green sheet, and possesses high flatness that has never been realized by any of the prior arts.

The invention claimed is:

1. A process for the production of a ceramic green sheet, comprising:

(1) producing a casting film which comprises forming, on a substrate film, an undercoat layer consisting of a condensation polymer from a metal alkoxide, a partially hydrolyzed product of a metal alkoxide, or a combination thereof, and then forming a cured layer on the undercoat layer, wherein the forming of the undercoat layer comprises:

placing a coating solution comprising the metal alkoxide, the partially hydrolyzed product of the metal alkoxide, or the combination thereof, in a coating amount of 0.05 to 0.2 g/m², expressed in terms of solid content; and heat treating the coating solution at 80 to 110° C.; and wherein the forming of the cured layer comprises:

placing an addition reaction type silicone resin composition comprising a photosensitizer, a platinum based compound as a catalyst, a polyorganosiloxane bearing a hexenyl group, and a polyorganosiloxane bearing at least two hydrogen atoms each bonded to a silicon atom in a coating amount of 0.05 to 0.2 g/m², expressed in terms of solid content, on the undercoat layer;

heat treating the composition at 40 to 120° C.; and ultraviolet irradiating the heat-treated composition to cure the composition and form the cured layer; and (2) producing the ceramic green sheet which comprises:

placing a ceramic slurry comprising one or more ceramic powders, solvent and a binder on the cured layer of the casting film; and drying the slurry.

2. The process of claim 1, wherein the coating amount of the coating solution of the undercoat layer is 0.1 to 0.2 g/m², expressed in terms of solid content.

3. The process of claim 1, wherein the metal alkoxide is tetraalkoxysilane.

4. The process of claim 1, wherein the substrate film is a biaxially oriented polyethylene terephthalate film.

5. The process of claim 1, wherein the temperature of heat treating the composition is 50 to 100° C.

* * * * *